United States Patent [19]
Morisawa

[11] Patent Number: 6,092,633
[45] Date of Patent: Jul. 25, 2000

[54] TRANSMISSION

[75] Inventor: Kunio Morisawa, Toyota, Japan

[73] Assignee: Toyota Jidosha Kabushiki Kaisha, Toyota, Japan

[21] Appl. No.: 09/170,281

[22] Filed: Oct. 13, 1998

[30] Foreign Application Priority Data

Oct. 16, 1997 [JP] Japan .................................. 9-299520

[51] Int. Cl.[7] .......................... F16D 13/04; F16D 27/08
[52] U.S. Cl. ..................... 192/35; 192/48.2; 192/84.1
[58] Field of Search ............................. 192/48.2, 84.1, 192/55.1, 58.1, 35

[56] References Cited

U.S. PATENT DOCUMENTS

| | | | |
|---|---|---|---|
| 4,896,754 | 1/1990 | Carlson et al. | 192/21.5 |
| 5,562,192 | 10/1996 | Dick | 192/84.1 |
| 5,884,738 | 3/1999 | Joslin et al. | 192/35 |
| 5,890,573 | 4/1999 | Kwoka | 192/35 |

FOREIGN PATENT DOCUMENTS 2-80847  3/1990  Japan .

OTHER PUBLICATIONS

Katsunori Aoki, et al., "A Novel Electrostatic Clutch Using Fibers", ERMR '97 International Conference in Japan, 1996, pp. 203–206. (With English Abstract).

Hiromitsu Tanaka, et al., "Field Responding Poly Alkyl Thiophene Gel", Theses of Polymers, vol. 50, No. 12, Dec. 1993, pp. 963–967. (With English Abstract).

*Primary Examiner*—Charles A. Marmor
*Assistant Examiner*—Tisha D. Waddell
*Attorney, Agent, or Firm*—Oblon, Spivak, McClelland, Maier & Neustadt, P.C.

[57] ABSTRACT

A transmission for changing a path to transmit a torque by changing the state of torque transmission to a rotary member, comprising: an active material for changing its state when fed with an electric signal; and a coupling mechanism for effecting or intercepting the torque transmission to the rotary member in accordance with the state change of the active material.

18 Claims, 4 Drawing Sheets

TRANSMISSION

BACKGROUND OF THE INVENTION

1. Field of the Invention

The present invention relates to a transmission for changing the transmission path of a torque by effecting the transmission of a torque to a predetermined rotary member or by intercepting the torque transmission and, more particularly, to an electrically controllable transmission.

2. Related Art

For example, a vehicular transmission is constructed such that the ratio in the number of revolutions between an input side rotary member and an output side rotary member is changed to execute speed changes: by selecting any of a plurality of paired gears of the constant-mesh type having different gear ratios; by changing a coupled state or a fixed state of rotary elements in a plurality of sets of planetary gear mechanisms; changing the external diameters of pulleys for the torque transmission; or by changing the contact position of a power roller, as arranged between a pair of discs, with the discs. The speed changes thus performed are executed not only by selecting the gear pair to participate in the torque transmission by transmitting the operating force of a shift lever to the transmission through a link mechanism but also by converting a gear ratio selecting operation into an electric signal thereby to activate a hydraulic actuator on the basis of the electric signal.

Moreover, an automatic transmission for selecting a gear stage automatically on the basis of the running state of a vehicle is constructed such that the gear stage is established according to the running state by detecting the vehicular running state electrically to convert it into an electric signal or by detecting the running state in terms of an oil pressure so that control valves may be interchanged on the basis of the electric signal or the hydraulic signal. This construction is disclosed, for example, in Japanese Patent Laid-Open No. 80847/1990 (JP-A-2-80847), in which the automatic transmission is integrally provided with a hydraulic servo mechanism in a frictional engagement device such as a clutch or a brake. Specifically, the frictional plates on the drive side and the frictional plates on the driven side are alternately arranged, and a piston to be reciprocally moved to and from those frictional plates is accommodated in a cylinder portion formed by a clutch drum or a casing. An oil pressure chamber is formed on the back side of the piston, and a return spring is arranged on the front side of the piston. Moreover, the piston is moved back and forth to apply/release the frictional engagement device by feeding/releasing the oil pressure to the oil pressure chamber via an oil passage formed through a shaft of rotation or the casing.

The hydraulic servo mechanism thus far described is employed as an actuator of not only the frictional engagement device of the automatic transmission but also the continuous variable transmission. In the prior art, moreover, there has also been developed a transmission which is enabled to have a manual shift mode similar to that of the manual transmission by outputting a speed change signal in the automatic transmission on the basis of the manual shifting operation so that the hydraulic servo mechanism may be controlled with the speed change signal. The reason why the oil pressure is adopted in any of those transmissions is that a force such as the operating force can be freely transmitted.

However, the transmission of this kind is constructed to change the portion to feed the oil pressure according to the control signal and to regulate the oil pressure. This construction requires a mechanism such as a hydraulic pump or a regulator valve for generating a line pressure as the source pressure. There are additionally required a solenoid valve for converting the electric signal into the hydraulic signal and a mechanism for regulating the oil pressure to be fed to the solenoid valve. It is further necessary to charge the transmission at all times with a large amount of oil (or fluid).

Thus according to the hydraulic device, the control of the speed change can be facilitated, but the mechanism for generating, regulating and controlling the oil pressure is complicated and large-sized. As a result, the transmission is increased in its whole weight and large-sized to deteriorate its mountability on the vehicle.

SUMMARY OF THE INVENTION

A main object of the invention is to provide a transmission which can be easily made compact and light.

Another object of the invention is to provide a transmission which is equipped with means for changing its state with an electric signal to change the state in which a torque is transmitted to a predetermined rotary member.

According to the invention, therefore, there is provided a transmission which comprises: an active material for changing its state when fed with an electric signal; and a coupling mechanism for effecting or intercepting the torque transmission to the rotary member in accordance with the state change of the active material.

The active material can be exemplified by a material having a viscosity changing with an electric signal, a material having a volume changing with an electric signal or a material for generating an electromagnetic force with an electric signal.

Between the active material and the coupling mechanism, there can be interposed a mechanism for converting the state change of the active material into an axial thrust. This mechanism can be exemplified by a cam mechanism or a piston.

In the transmission of this invention, moreover, the coupling mechanism can be interposed between two rotary members for changing the transmission path of the torque to set a predetermined gear ratio. If the state of the active material is changed with the electric signal, therefore, the torque transmission path is changed to make a speed change. In short, the speed change can be executed not hydraulically.

Since the actuator for activating the coupling mechanism is exemplified by a member for changing its state with the electric signal, according to the invention, another hydraulic means need not be interposed between the electric signal and the actuator. As a result, it is possible to provide a light and compact transmission.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENTS

Figure 2:
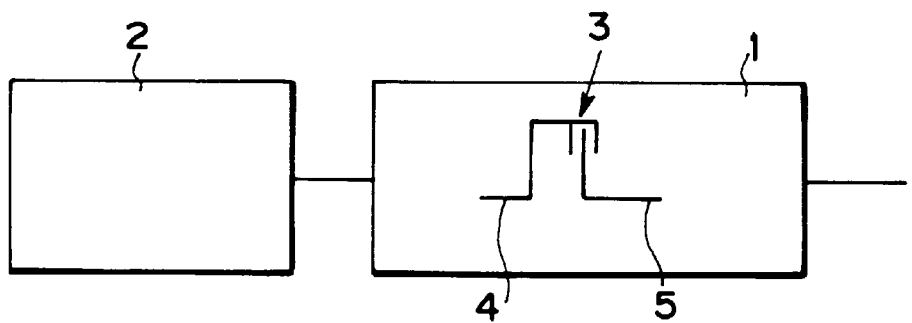
FIG. 2 is a block diagram schematically showing a power system of a vehicle having the transmission of the invention mounted thereon.

The invention will be described in connection with its specific embodiments with reference to the accompanying drawings. The invention can be applied to a transmission 1 of a vehicle, which is connected to the output side of a prime mover 2 such as an internal combustion engine or a motor, for example, as shown in FIG. 2. Between this prime mover 2 and the transmission 1, there can be interposed suitable input means such as a clutch for intercepting the transmission of a torque in between selectively or a fluid coupling capable of turning a member on a drive side while stopping a member on a driven side.

Figure 1:
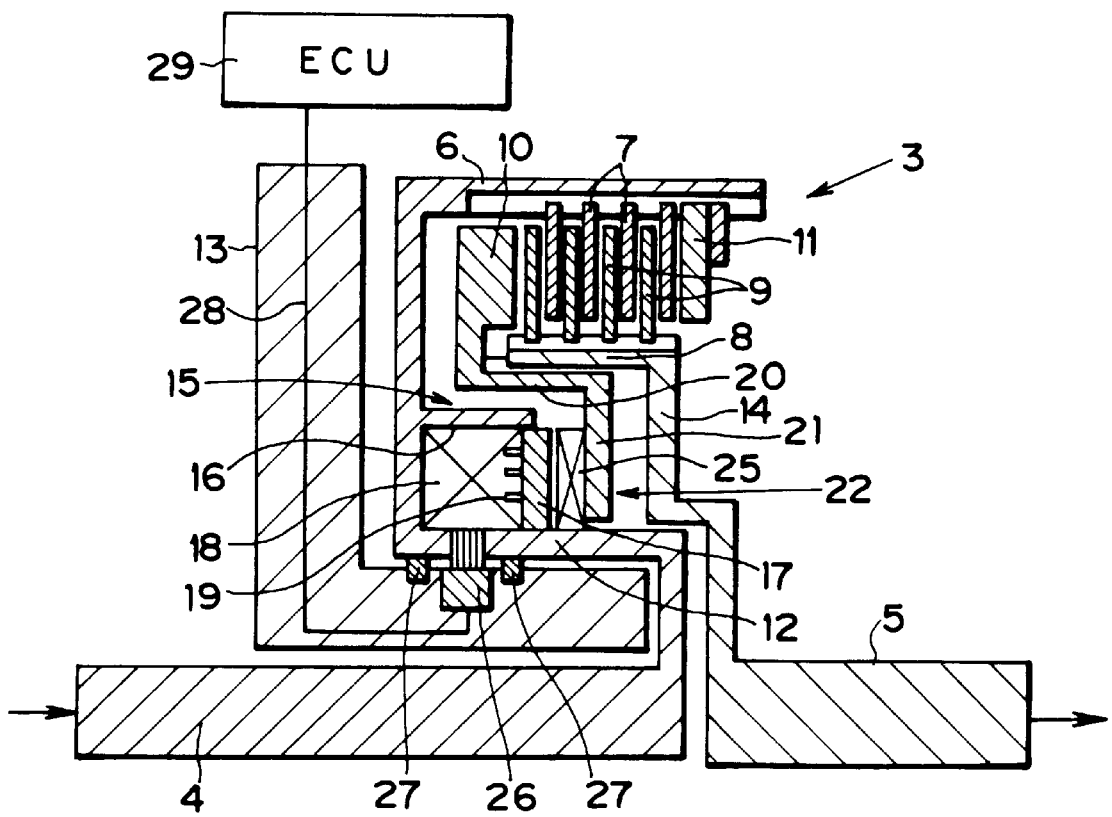
FIG. 1 is a schematic diagram showing a clutch and its drive mechanism in a transmission according to the invention.

This transmission 1 is provided with at least one pair of rotary members 4 and 5 to be selectively connected/disconnected by a clutch 3. As this clutch 3 is applied/released, the transmission path of the torque is changed to change the ratio between an input revolution number and an output revolution number, i.e., the gear ratio. In short, the clutch 3 is constructed to effect and intercept the torque transmission selectively and can be exemplified by a multiple disc type, as shown in FIG. 1. In this multiple disc clutch 3, a plurality of clutch plates 7, as splined to a clutch drum 6, and a plurality of clutch discs 9, as splined to a clutch hub 8, are alternately arranged and are clamped between an annular piston 10 and a stationary plate 11 so that the torque may be transmitted by the fictional forces which are established between the clutch plates 7 and the clutch discs 9. Here, the stationary plate 11 is fixed on the clutch drum 6 by means of a snap ring.

This clutch drum 6 is provided on its inner circumferential side with an axially extending boss portion 12, which is fitted on the outer circumferential side of a support portion 13 integrated with a (not-shown) casing so that it is rotatably supported by the support portion 13. Moreover, the clutch drum 6 is so connected to the rotary member 4 such as an input shaft, an intermediate shaft, a connecting shaft or a gear for setting a predetermined gear stage as to rotate with the rotary member 4. On the other hand, the clutch hub 8 is a cylindrical member having a smaller diameter than that of the outer circumferential side cylindrical portion of the clutch drum 6 and is integrated through a flanged connecting portion 14 with the rotary member 5 such as an output shaft, an intermediate shaft, a connecting shaft or a gear for setting a predetermined gear stage.

Here will be described a drive mechanism for applying/releasing the clutch 3, that is, a drive mechanism 15 for moving the piston 10 axially back and forth. On the outer circumferential side of the boss portion 12 integrated with the clutch drum 6, there is formed a cylindrical chamber 16 which is opened toward the leading end of the clutch drum 6, i.e., toward the connecting portion 14. In the opening of the chamber 16, there is liquid-tight and rotatably fitted an annular drive plate 17. In other words, this drive plate 17 seals up the chamber 16 liquid-tight. Moreover, this chamber 16 is charged therein with such an active material 18 as will change its state when an electric signal is fed. This active material 18 is exemplified by such an electromagnetic viscous fluid as will increase its viscosity when electrically powered. This can adopt the electromagnetic viscous fluid (ERMR '97 International Conference in Japan), as disclosed in the paper which is published by Bayer Corporation in 1997.

On the inner face of the drive plate 17, as located on the side of the chamber 16, there are integrally formed a plurality of fins 19 which are protruded into the active material 18. These fins 19 are specified, in FIG. 1, by arcuate or annular thin sheets extending in the circumferential direction but may be exemplified by sheet members directed radially of the drive plate 17. As a result, the torque according to the viscosity of the active material 18 is transmitted through the fins 19 from the active material 18 to the drive plate 17.

With the inner circumferential end portion of the piston 10, on the other hand, there is integrated a cylindrical portion 20 which is so splined to the clutch hub 8 as to move in the axial direction. With the cylindrical portion 20, moreover, there is integrated a driven plate 21 which is so extended toward the inner circumferential side as to confront the front face (opposed to the face having the fins 19) of the drive plate 17. In other words, the drive plate 17 and the driven plate 21 confront each other to form a cam mechanism 22 in between.

Figure 3:
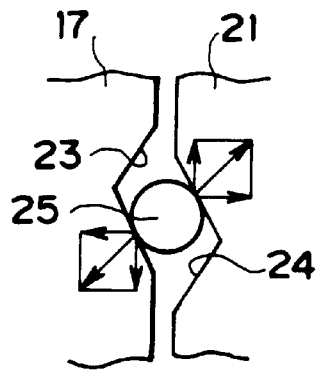
FIG. 3 is a partial diagram for explaining a cam mechanism in the clutch shown in FIG. 1.

This cam mechanism 22 is a mechanism for acting to separate the drive plate 17 and the driven plate 21 in the axial direction when the torque is established between those plates 17 and 21. As shown in FIG. 3, more specifically, the cam mechanism 22 is constructed such that a cylindrical or spherical member such as a roller 25 is sandwiched between triangular recesses 23 and 24 which are formed in the confronting portions of those plates 17 and 21. As a result, the roller 25 is clamped between the slopes individually forming the recesses 23 and 24, as the individual plates 17 and 21 shift in phase relative to each other, so that the torque causes an axial force to separate the individual plates 17 and 21 by the actions of the slopes. By reducing the slope angles of the recesses 23 and 24, the rotational force is made weaker than the axial force so that the electromagnetic force or the viscous force of a polymeric material can be employed as a thrust for applying the clutch.

Here will be described a construction for feeding an electric signal to the active material 18 described hereinbefore. Between the boss portion 12 of the clutch drum 6 and the support portion 13 fitted on the former, there is arranged a conductor 26 which has an electric conduction to the active material 18. This conductor 26 is exemplified by a conductive fluid such as mercury and is sealed up between the support portion 13 and the boss portion 12 by a pair of seal members 27 fitted on the outer circumference of the support portion 13. Here, the conductor 26 is electrically insulated from the support portion 13 and the clutch drum 6. Moreover, a wire 28 for applying electricity to the conductor 26 is threaded through the inside of the support portion 13 so that a control current is fed through the wire 28 to the active material 18 from an electronic control unit (ECU) 29.

Here will be described the actions of the clutch 3 in the transmission 1 thus far described. In the state of a gear stage at which no torque is transmitted between the two rotary members 4 and 5, the active material 18 receives no electricity so that its viscosity is set in the lowermost state. As a result, the clutch 3 is kept in its released state. Specifically, the piston 10 rotates together with the clutch hub 8 or the rotary member 5 because the cylindrical member 20 integrated therewith is splined to the clutch hub 8. Moreover, the driven plate 21 integral with the clutch 10 rotates together with the rotary member 5. The drive plate 17, as confronting the driven plate 21, is arranged on the side of the clutch drum 6 and is made rotatable relative to the clutch drum 6 and the chamber 16. Moreover, the active material 18 takes a liquid state having a low viscosity because it receives no electricity, so that the drive plate 17 receives little torque from the clutch drum 6.

As a result, the drive plate 17 and the driven plate 21 are integrated in the rotational direction through the roller 25 of the cam mechanism 22, but the drive plate 17 can rotate freely relative to the clutch drum 6. Even with a relative rotation between the rotary members 4 and 5, therefore, the torque is extremely low between those plates 17 and 21. As a result, there is established little axial force for separating the drive plate 17 and the driven plate 21 in the axial direction, so that the piston 10 is kept in the leftwardly retracted state, as seen in FIG. 1, that is, in the state in which it pushes neither the clutch plates 7 nor the clutch discs 9. Here, a (not-shown) return spring for returning the piston 10 to such a state may be provided at a suitable position.

When a speed change is decided in terms of a change in the running state such as a vehicle speed or a throttle opening or a speed changing operation is performed by the manual operation of a driver so that the electric signal is fed from the electronic control unit 29 to the active material 18, the viscosity of the active material 18 rises. With a relative rotation between the two rotary members 4 and 5, on the other hand, the drive plate 17 rotates relative to the clutch drum 6, as described hereinbefore, so that the fins 19 formed on the drive plate 17 move in the active material 18 to apply a shearing action to the active material 18. As the viscosity of the active material 18 rises, therefore, a shearing resistance to be established between the active material 18 and the fins 19 rises to increase the transmission torque between the clutch drum 6 and the drive plate 17 through the active material 18.

In other words, the tendency for the drive plate 17 to be integrated with the clutch drum 6 rises to increase the torque to act between the drive plate 17 and the driven plate 21. As a result, the roller 25 is intensely bitten between the slopes forming the recesses 23 and 24 of the individual plates 17 and 21, that is, the cam mechanism 22 functions to increase the axial force to separate the individual plates 17 and 21 in the axial direction.

Since the driven plate 21 and the piston 10 are made integral, the piston 10 moves together with the driven plate 21 lightwardly of FIG. 1, i.e., toward the clutch plates 7 and the clutch discs 9 when the driven plate 21 receives the axial load, as described hereinbefore. Moreover, the clutch plates 7 and the clutch discs 9 are clamped by the piston 10 between this piston 10 and the stationary plate 11 so that they come into fractional contact with each other. In other words, the clutch 3 comes into its applied state so that the individual rotary members 4 and 5 are connected to rotate together. Hence, this clutch 3 corresponds to a coupling mechanism in the invention.

Then, a reaction resulting from the push of the driven plate 21 and the piston 10 through the cam mechanism 22 is applied to the clutch drum 6 through the active material 18. Simultaneously as the piston 10 pushes the clutch plates 7 and the clutch discs 9 lightwardly of FIG. 1, on the other hand, this pushing force is received by the stationary plate 11 so that the action and reaction, as established in the cam mechanism 22, operate as the application force of the clutch 3 and its reaction and are offset. In the construction shown in FIG. 1, therefore, the thrust accompanying the application of the clutch 3 will not act on the support portion 13. This makes it unnecessary to employ a bearing member such as a thrust bearing functioning in the axial direction, so that the number of parts can be reduced.

For releasing the clutch 3, it is sufficient to interrupt the power supply to the active material 18. Thus, the viscosity of the active material 18 drops to effect little transmission of the torque from the clutch drum 6 to the drive plate 17. As a result, the axial force to the piston 10 through the cam mechanism 22 disappears so that the piston 10 retracts leftwardly of FIG. 1 to bring the clutch 3 into the released state. In short, the construction shown in FIG. 1 can control the application/release of the clutch 3 wholly electrically. Then, the clutch 3 can be released more reliably by providing the return spring.

In an apparatus using the above-described active material 18, the torque is transmitted by the shearing resistance of the active material 18. As a result, the increase of the shearing action applied to the active material 18 makes it possible to raise the torque to be transmitted. In the embodiment shown in FIG. 4, there are alternately arranged the fins 19, as fitted on the drive plate 17 and lengthwise protruded into the chamber 16, and a plurality of other fins 19A fitted on the inner face of the chamber 16.

Figure 4:
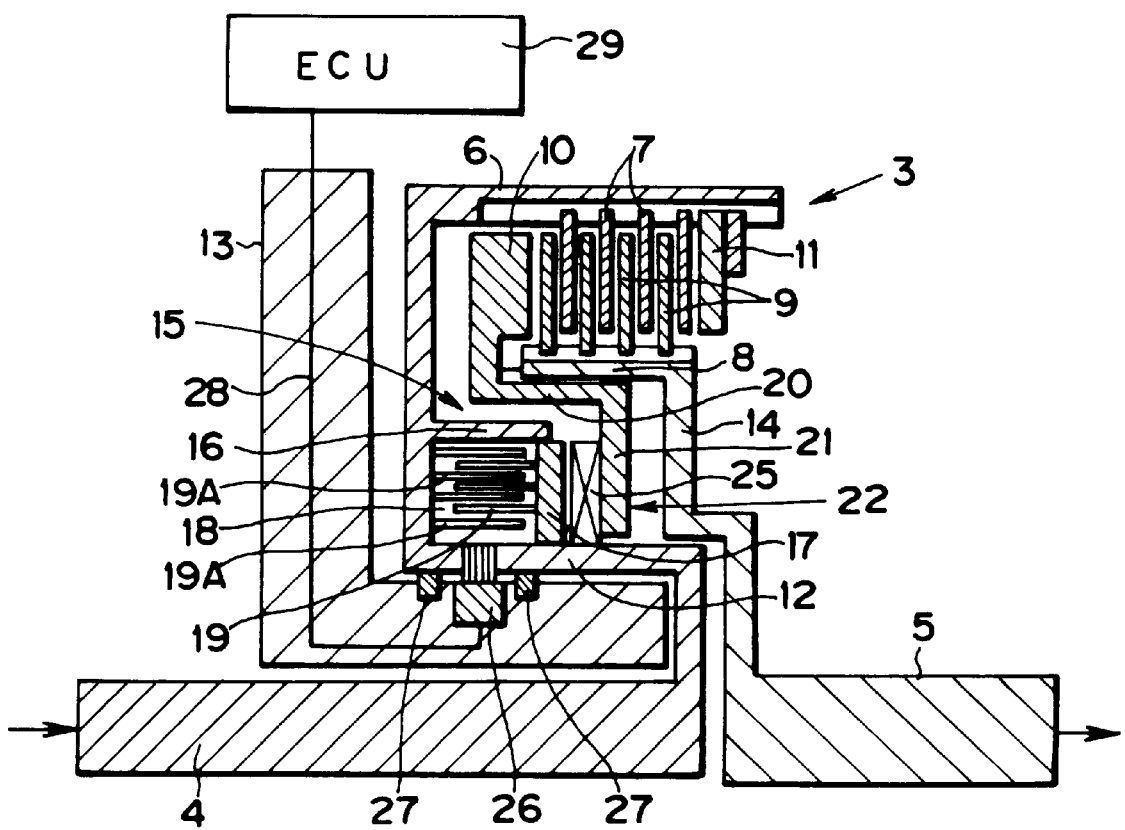
FIG. 4 is a schematic diagram showing another example of a drive mechanism constructed such that a shearing action is established in an active material by a plurality of fins.

In the embodiment shown in FIG. 4, therefore, the shearing action of the active material 18 is established between each of fins 19 and 19A. The part to establish the torque transmission is increased by the shearing action so that a high torque can be transmitted to the drive plate 17.

Figure 5:
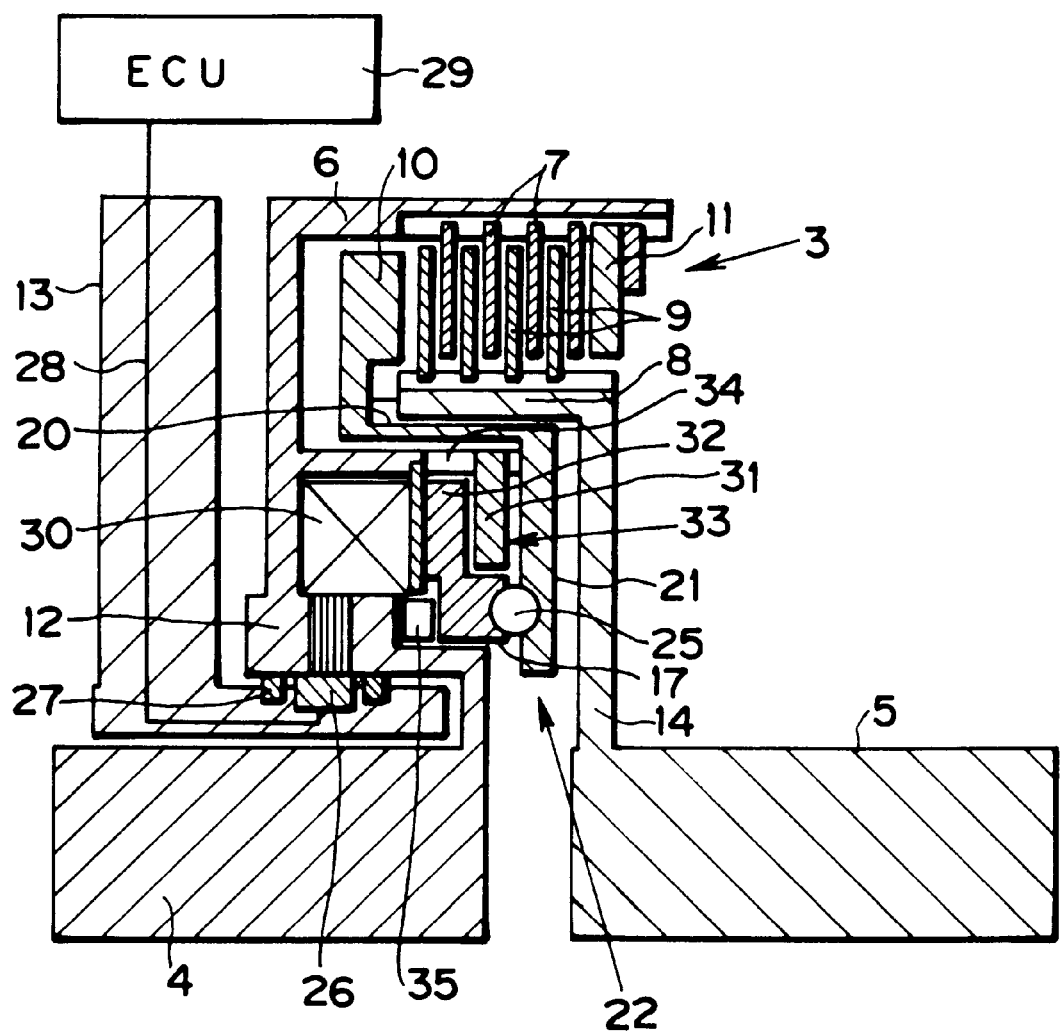
FIG. 5 is a schematic diagram showing another clutch and its drive mechanism in the transmission according to the invention.

Here will be described another embodiment of the invention. This embodiment, as shown in FIG. 5, is constructed such that the application/release of the clutch 3 are controlled by utilizing an electromagnetic force. Here, this transmission of FIG. 5 is partially modified in the construction of that of FIGS. 1 and 3. Thus, the same portions of FIG. 5 as those of FIGS. 1 and 3 are designated by the common reference numerals, and their description will be omitted.

On the outer circumferential side of the boss portion 12, as shown in FIG. 5, there is arranged in place of the active material 18 an electromagnetic member 30 such as an electromagnetic coil for establishing an electromagnetic force when energized. Between this electromagnetic member 30 and the drive plate 21, there are axially juxtaposed a plate 31 to be magnetically attracted by the electromagnetic member 30, and a disc 32 to be selectively clamped between the plate 31 and the electromagnetic member 30. These plate 31 and disc 32 construct the so-called "pre-clutch mechanism" 33, and the plate 31 is so splined to a cylindrical member 34 integrated with the clutch drum 6 as to move in the axial direction. On the other hand, the disc 32 is integrated with the drive plate 17 in the cam mechanism 22. As a result, the disc 32 is clamped between the electromagnetic member 30 and the plate 31 to increase the frictional force so that the torque is transmitted from the clutch drum 6 to the drive plate 17 in the cam mechanism 22.

In the construction shown in FIG. 5, therefore, the drive plate 17 is a member not constructing the chamber 16 but made independent of the clutch drum 6. Between this drive plate 17 and the leading end portion of the boss portion 12 of the clutch drum 6, moreover, there is arranged a thrust bearing 35. In this embodiment shown in FIG. 5, on the other hand, it is also arbitrary to provide the return spring for returning the piston 10 to its released state.

In the state shown in FIG. 5, the clutch 3 is released. When the electromagnetic member 30 is energized from this state to establish an electromagnetic force, the plate 31 is attracted toward the electromagnetic member 30 so that the disc 32 is clamped between the plate 31 and the electromagnetic member 30. In short, the pre-clutch mechanism 33 takes its applied state, in which the torque is transmitted from the clutch drum 6 to the drive plate 17 in the cam mechanism 22.

With the two rotary members 4 and 5 rotating relative to each other, the torque is transmitted to the drive plate 17 so that a shift in the rotational direction, i.e., a phase shift is caused between the drive plate 17 and the driven plate 21. As a result, as in the foregoing embodiment, an axial force is caused by the torque acting between those plates 17 and 21 so that the driven plate 21 is pushed rightwardly of FIG. 5. Thus, the piston 10 is moved forward to apply the clutch 3. In short, the cam mechanism 22 is functioned so as to convert the rotational force into the axial force by the electromagnetic force generated by the electromagnetic member 30. Thus, the pre-clutch mechanism 33 and cam mechanism 22 construct a cam mechanism of the invention.

In the construction shown in FIG. 5, therefore, the application/release of the clutch 3 can be controlled wholly electrically. Moreover, the action to apply the clutch 3 and its reaction are offset so that the thrust load will not be applied to the support portion 13.

Figure 6:
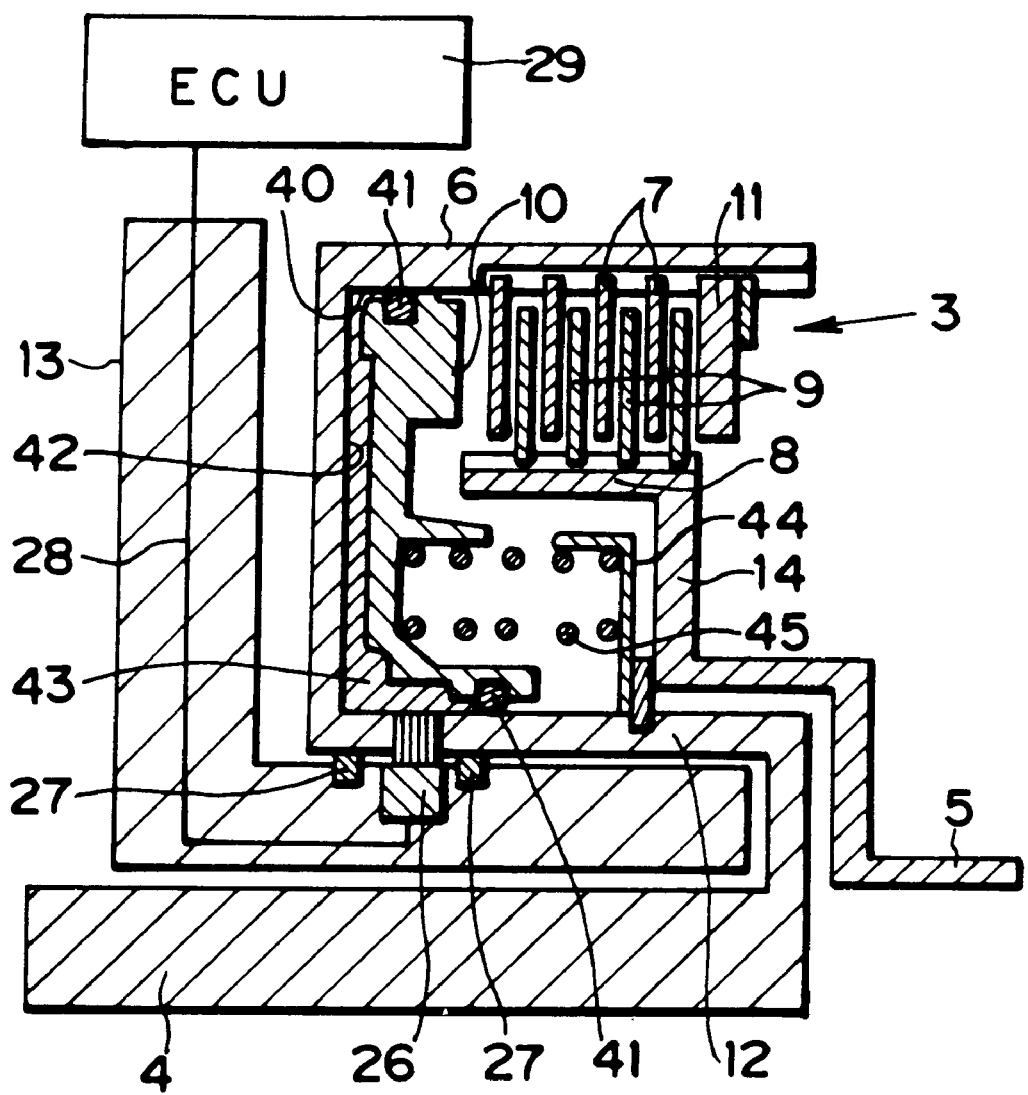
FIG. 6 is a schematic diagram showing still another clutch and its drive mechanism in the transmission according to the invention.

Still another embodiment of the invention will be described with reference to FIG. 6. This embodiment of FIG. 6 is constructed such that the clutch 3 is applied by pushing the piston 10 directly with the active material. In the inside (as located on the outer circumferential side of the boss portion 12) of the clutch drum 6, more specifically, there is formed a cylinder 40, in which the piston 10 is so accommodated as to move axially back and forth. This piston 10 is formed annular in its entirety like the cylinder 40, and seal rings 41 are fitted in the inner and outer circumferences of the piston 10 to keep an accommodation chamber 42, as located on the back face side of the piston 10, in a liquid-tight state.

Moreover, this accommodation chamber 42 is charged with such an active material 43 as will increase its volume when an electric signal is fed. The active material 43 of this kind may be preferably such a material as will increase its volume according to the voltage or current, more specifically, "Field Responding Poly Alkyl Thiophene Gel" on page 963 of Theses of Polymers Vol. 50, No. 12, 1993, for example. Here, the power supply to this active material 43 is effected through the conductor 26 which is arranged between the support portion 13 and the boss portion 12.

On the front side (as located at the righthand side of FIG. 6) of the piston 10, there is fixed a retainer 44 which is fitted on the boss portion 12. Between the retainer 44 and the piston 10, there is arranged a return spring 45 for retracting the piston 10 to the accommodation chamber 42.

In the construction shown in FIG. 6, therefore, the active material 43 expands when fed with the electric signal through the conductor 26. As a result, the piston 10 is moved rightwardly of FIG. 6 so that the clutch plates 7 and the clutch discs 9 are clamped between the piston 10 and the stationary plate 11 to come into frictional contact with each other. In other words, the clutch 3 is applied to connect the two rotary members 4 and 5 in a torque transmittable manner. If the feed of the electric signal to the active material 43 is interrupted, on the contrary, it shrinks so that the piston 10 is retracted by the push of the return spring 45 thereby to release the clutch 3.

Thus, with the construction shown in FIG. 6, the application/release of the clutch 3 can also be controlled wholly electrically, and the thrust will not act on the surrounding members of the clutch 3 even as the clutch 3 is applied. When the increase in the volume of the active material 43 is smaller for the necessary stroke for the piston 10, there may be added a mechanism for converting the expansion of the active material 43 into an axial change. When the pushing force accompanying the expansion of the active material 43 is weaker than the force necessary for applying the clutch 3, on the contrary, there may be incorporated a suitable servo mechanism.

In the transmission provided with the clutch 3 according to the invention, as described hereinbefore, the application/release of the clutch 3 can be controlled wholly electrically so that their control system can be simplified in construction. Especially in the case of a transmission adopting a plurality of frictional engagement devices such as clutches, their control system can be constructed of only the wiling. As a result, the effect to simplify the construction of the control system is prominent, and the size/weight of the transmission are advantageously reduced.

Moreover, each of the foregoing transmissions does not employ the oil pressure which might otherwise be essential for the automatic transmission of the prior art, so that it requires neither the oil pressure establishing means nor the pressure regulating means. In addition, the electric energy can be directly converted into a mechanical force with requiring neither the conversion of the mechanical force into the oil pressure nor the conversion of the oil pressure into the mechanical force, thereby to provide a transmission of high energy efficiency. Especially for an electric car having an electric prime mover, the energy efficiency can be effectively improved.

Here, the invention should not be limited to the foregoing individual specific embodiments, but the mechanism for applying the clutch 3 in accordance with the state change in the active material 18 may be exemplified not only by the aforementioned cam mechanism 22 but also by a suitable link mechanism. The invention can also be applied to transmissions employing a wide variety of coupling mechanisms other than the clutch, and these coupling mechanisms may be other than those for executing the speed changes. In other words, the invention can be applied to an automatic transmission, a manual transmission, a continuously variable transmission or a four-wheel drive transfer. In addition, the transmission of this invention may be exemplified not only by one for the vehicle having an internal combustion engine as its prime mover but also by one for a hybrid car having a motor and an engine as its prime mover or an electric car having a motor as its prime mover.

Here will be generally described the advantages to be achieved by the invention. According to the invention, the active material is changed in the state of its viscosity or volume when fed or not with the electric signal on the basis of the running state or the manual operation, so that the coupling mechanism accordingly effects or intercepts the torque transmission to the rotary members. As a result, the coupling mechanism can be activated to execute the speed changes exclusively by the electric controls. According to the invention, therefore, the hydraulic mechanism, as used in the prior art, can be eliminated to reduce the size and weight of the transmission.

According to the invention, the reaction against the force for coupling the two members in the torque transmitting manner by feeding the electric signal to the active material and by the action of the coupling mechanism can be established between those two rotary members so that the load to couple those rotary members and its reaction can be offset to make the reaction receiving member unnecessary.

By energizing the electromagnetic member, according to the invention, the cam mechanism is activated by the electromagnetic force. As a result, the torque to be established between the two rotary members is converted into the axial force to bring the frictional plates into engagement so that the torque is transmitted between the two rotary members. Thus, the transmission and interception of the torque between these two rotary members can be performed exclusively by the electric control so that the hydraulic mechanism, as used in the prior art, can be eliminated to reduce the size and weight of the transmission. Here, the material to change its state may be exemplified by one which is characterized to change its state in accordance with the temperature.

What is claimed is:

1. A transmission for changing a torque transmission path to a rotary member, comprising:
    a coupling mechanism configured to effect or release the torque transmission to the rotary member;
    a piston movable to a position causing the coupling mechanism to effect or release the torque transmission; and
    an active material which does not rotate and which changes a state thereof when fed with an electric signal, said active material being cooperable with said piston move said piston to the position when the state of said active material is changed.

2. A transmission according to claim 1,
    wherein said active material includes a material having a viscosity changing when fed with the electric signal.

3. A transmission according to claim 1, further comprising:
    a conductive fluid as a member for feeding the electric signal to said active material.

4. A transmission according to claim 1,
    wherein said active material includes a material having a volume changing when fed with the electric signal.

5. A transmission according to claim 1, further comprising:
    at least two rotary members adapted to be selectively connected to change the transmission path of the torque thereby to set a predetermined gear ratio,
    wherein said coupling mechanism is arranged between said two rotary members to connect said two rotary members selectively.

6. A transmission according to claim 2, further comprising:
    a drive mechanism for establishing a torque by changing the viscosity of said active material and for establishing an axial thrust to establish a coupling force of said coupling mechanism, with said torque.

7. A transmission according to claim 3,
    wherein said drive mechanism includes: a plurality of fin-shaped members inserted into said active material; a drive side member integrated with said fin-shaped members; and a cam mechanism for establishing said axial thrust with the torque of said drive side member.

8. A transmission according to claim 3,
    wherein said drive mechanism includes: a chamber for accommodating said active material and rotating about a predetermine axis and having an opening directed toward an axial direction; a drive side member for sealing up the opening of the chamber and made movable in the axial direction; a plurality of first fin-shaped members provided integrally with said drive side member and inserted into said active material; and a plurality of second fin-shaped members alternately arranged between the plurality of first fin-shaped members and fitted on the inner face of said chamber.

9. A transmission according to claim 4,
    wherein said coupling mechanism includes: a piston to be pushed by said cam mechanism; a stationary plate fixed on a member, as made rotatable together with said drive side member, and confronting said piston in the axial direction; and a plurality of frictional plates arranged between said piston and said stationary plate.

10. A transmission according to claim 8,
    wherein said coupling mechanism includes: a piston to be pushed by said active material; a stationary plate fixed on a member, as made rotatable together with said drive side member, and confronting said piston in the axial direction; and a plurality of frictional plates arranged between said piston and said stationary plate.

11. A transmission for changing a path to transmit a torque by connecting two rotary members selectively in a torque transmittable manner, comprising:
    an electromagnetic member arranged between said two rotary members for generating, when energized, an electromagnetic force in the axial direction;
    a cam mechanism for functioning, by the electromagnetic force generated by said electromagnetic member, to convert the torque between said two rotary members into an axial thrust;
    a plurality of frictional plates adapted to be brought into frictional contact by said axial thrust, as established by said cam mechanism, to transmit the torque between said two rotary members;
    a plate made rotatable together with a drive side member of said cam mechanism; and
    a pair of plate-shaped members for clamping said plate to establish a frictional force with the electromagnetic force generated by said electromagnetic member.

12. A transmission according to claim 11, further comprising:
    a piston arranged to confront said frictional plates in the axial direction and adapted to be pushed in the axial direction by said cam mechanism; and
    a stationary plate arranged at a position to confront said piston in the axial direction across said frictional plates and fixed on a member made rotatably together with said paired plate-shaped members.

13. A transmission according to claim 11, further comprising:
    a conductive fluid as a member for feeding the electric signal to said electromagnetic member.

14. A transmission for changing a torque transmission path to a rotary member, comprising:
    a coupling mechanism configured to effect or release the torque transmission to the rotary member;
    a piston movable to a position causing the coupling mechanism to effect or release the torque transmission;
    an active material which changes a state thereof when fed with an electric signal, said material being cooperable with said piston to move said piston to the position when the state of said active material is changed;

a chamber for accommodating the active material and rotatably supported on a stationary portion; and a conductive member for feeding the electric signal to the active material through the stationary portion and the chamber.

15. A transmission according to claim 14, wherein said active material includes a material having a viscosity changing when fed with the electric signal.

16. A transmission according to claim 14, wherein the conductive material includes a conductive fluid as a member for feeding the electric signal to said active material.

17. A transmission according to claim 14, wherein said active material includes a material having a volume changing when fed with the electric signal.

18. A transmission according to claim 14, further comprising:

at least two rotary members adapted to be selectively connected to change the transmission path of the torque thereby to set a predetermined gear ratio, wherein said coupling mechanism is arranged between said two rotary members to connect said two rotary members selectively.

* * * * *